United States Patent
Amend et al.

(10) Patent No.: US 11,799,802 B2
(45) Date of Patent: Oct. 24, 2023

(54) DATA TRAFFIC CONTROL DEVICE, A RESIDENTIAL ROUTER, AN OPERATOR NETWORK DEVICE AND A TELECOMMUNICATION SYSTEM

(71) Applicant: Deutsche Telekom AG, Bonn (DE)

(72) Inventors: Markus Amend, Nidda (DE); Eckard Bogenfeld, Carlsberg (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 17/471,198

(22) Filed: Sep. 10, 2021

(65) Prior Publication Data
US 2022/0086107 A1    Mar. 17, 2022

(30) Foreign Application Priority Data
Sep. 11, 2020    (EP) .................................. 20 195 720

(51) Int. Cl.
*H04L 49/90*    (2022.01)
*H04L 45/24*    (2022.01)
(Continued)

(52) U.S. Cl.
CPC .............. *H04L 49/90* (2013.01); *H04L 45/24* (2013.01); *H04L 45/58* (2013.01); *H04L 47/2433* (2013.01); *H04L 47/6275* (2013.01)

(58) Field of Classification Search
CPC ......... H04L 49/90; H04L 45/24; H04L 45/22; H04L 45/58; H04L 47/2433; H04L 47/50;
(Continued)

(56) References Cited

U.S. PATENT DOCUMENTS 7,701,949 B1 * 4/2010 Rose ..................... H04L 47/245
370/395.42
10,630,813 B2   4/2020 Skog et al.
(Continued)

FOREIGN PATENT DOCUMENTS

WO    WO 2017198285 A1    11/2017

OTHER PUBLICATIONS

Nico Bayer, et al., "Bundling of DSL resources in home environments", 17th International Symposium on a World of Wireless, Mobile and Multimedia Networks (WOWMOM), Jun. 21, 2016, pp. 1-7, IEEE, New York, USA, XP032930320.

*Primary Examiner* — Mohamed A Kamara
(74) *Attorney, Agent, or Firm* — LEYDIG, VOIT & MAYER, LTD.

(57) ABSTRACT

A data traffic control device for controlling different data traffic includes: a first access interface; a data memory; and at least one control unit. The at least one control unit is configured to: store, on the data memory, first data traffic in a first transmission queue, second data traffic in a second transmission queue and third data traffic in a third transmission queue, wherein different priorities are assigned to the first, second and third transmission queues; read out the first data traffic, the second data traffic and the third data traffic stored on the data memory according to the priorities assigned to the first, second and third transmission queues; and transmit, via the first access interface, the first data traffic, the second data traffic and the third data traffic in an order as read out.

9 Claims, 4 Drawing Sheets

(51) Int. Cl.
  *H04L 47/6275* (2022.01)
  *H04L 45/58* (2022.01)
  *H04L 47/2425* (2022.01)

(58) Field of Classification Search
  CPC .......... H04L 47/6275; H04L 49/3027; H04W 28/0819; H04W 28/0933
  See application file for complete search history.

(56) References Cited

U.S. PATENT DOCUMENTS

| | | | |
|---|---|---|---|
| 2004/0208177 A1* | 10/2004 | Ogawa | H04L 49/90 370/392 |
| 2020/0029382 A1 | 1/2020 | Cullerot et al. | |
| 2020/0274819 A1* | 8/2020 | Nahum | H04L 47/2441 |
| 2020/0336411 A1* | 10/2020 | Batardière | H04L 47/193 |
| 2022/0086107 A1* | 3/2022 | Amend | H04L 47/2433 |

* cited by examiner

DATA TRAFFIC CONTROL DEVICE, A RESIDENTIAL ROUTER, AN OPERATOR NETWORK DEVICE AND A TELECOMMUNICATION SYSTEM

CROSS-REFERENCE TO PRIOR APPLICATIONS

This application claims benefit to European Patent Application No. EP 20 195 720.6, filed on Sep. 11, 2020, which is hereby incorporated by reference herein.

TECHNICAL FIELD

The present invention relates to a data traffic control device, a residential router (in particular suitable for transmitting data packets to and/or receive data packets from a data network), an operator network device (in particular suitable for transmitting data packets to and/or receiving data packets from at least one residential router), and a telecommunication system including a plurality of residential routers and an operator network device.

BACKGROUND

In order to improve throughput and resilience to access network failure, digital subscriber line (DSL) resources of access links provided by different residential routers can be bundled.

Such an approach is described by Nico Bayer et al. in the paper "Bundling of DSL resources in home environments", 2016 IEEE 17th International Symposium on a World of Wireless, Mobile and Multimedia networks (WoWMoM), DOI: 10.1109-WoWMoM.2016.7523515. In this paper, a communication system comprising a plurality of DSL routers and an access aggregation point (AAP) as a termination point of a backbone network or the Internet is described, which is able to bundle DSL resources of neighboring DSL routers, which are connected to each other via so-called community links. The community links are based on Wi-Fi or Powerline Communication technology. A Multipath Transmission Control Protocol (MPTCP) module and a Quality of Service (QoS) module is implemented on each DSL router to transfer a TCP session into a MPTCP session with multiple sub-streams to ensure that capacity of available paths can be bundled. The QoS module is used to ensure bandwidth fairness between TCP traffic of a respective DSL router and TCP traffic of neighboring DSL routers which passes through the respective DSL router due to the access bundling mechanism. This is achieved by putting TCP traffic of the respective DSL router into a higher priority queue and TCP traffic of the neighboring DSL routers into a lower priority queue. However, a mechanism is implemented in each DSL router which guarantees that a very low bandwidth is assigned to the TCP traffic of neighboring DSL routers to keep the connection of neighboring traffic via the respective DSL router alive.

SUMMARY

In an exemplary embodiment, the present invention provides a data traffic control device for controlling different data traffic. The data traffic control device includes: a first access interface configured to transmit data traffic via a first access network; a data memory; and at least one control unit configured to: execute first instructions, stored on the data traffic control device, to store, on the data memory, first data traffic in a first transmission queue, second data traffic in a second transmission queue and third data traffic in a third transmission queue, wherein different priorities are assigned to the first, second and third transmission queues; execute second instructions, stored on the data traffic control device, to read out the first data traffic, the second data traffic and the third data traffic stored on the data memory according to the priorities assigned to the first transmission queue, the second transmission queue and the third transmission queue; and execute third instructions, stored on the data traffic control device, to transmit, via the first access interface, the first data traffic, the second data traffic and the third data traffic in an order as read out. The first data traffic, the second data traffic and the third data traffic each comprise a plurality of data packets.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Exemplary embodiments of the present invention provide a data traffic control device, a residential router comprising a data traffic control device, an operator network device comprising a data traffic control device, and a telecommunication system, which allow for improved control of different traffic transmitted by them to enhance data throughput and resilience, in particular in case of an access network failure.

Exemplary embodiments of the present invention provide a data traffic control device, a residential router, an operator network device, and a telecommunication system.

Figure 1:
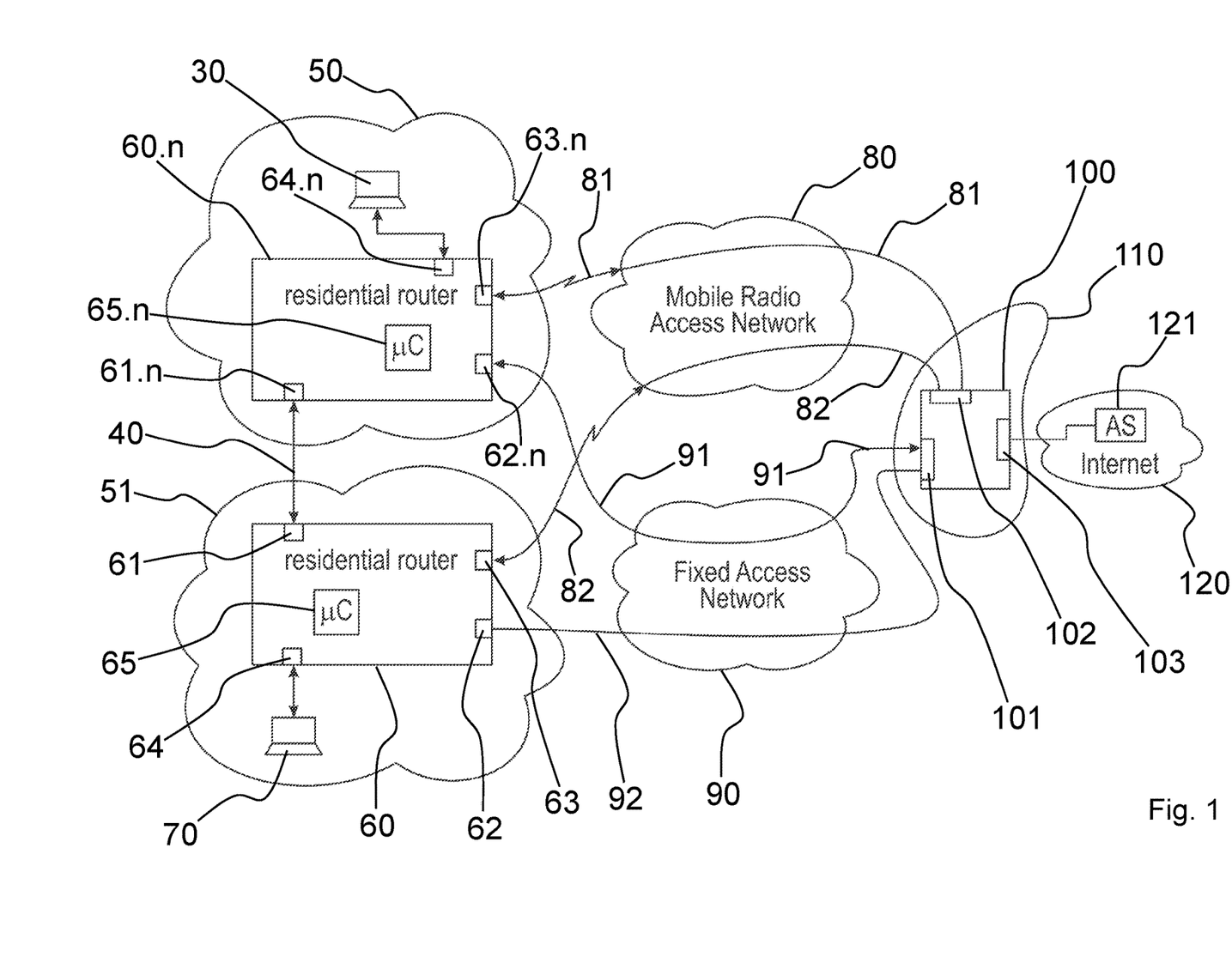
FIG. 1 shows an exemplary telecommunication system including a residential router community of at least two residential routers and an operator network device as a network termination point.

Referring now to FIG. 1, an exemplary telecommunication system 10 is shown. It is in particular adapted to control different data traffic and may bundle access links of different residential routers 60, 60.$n$ for improving data throughput and resilience to access network failure, in particular by transmitting uplink traffic via different residential routers, e.g. residential routers 60 and 60.$n$, to a termination point 100 and downlink traffic from the termination point 100 to the residential routers, e.g. residential routers 60 and 60.$n$. In the exemplary telecommunication system 10, only two residential routers are depicted, but in practice more than two residential routers may be deployed.

The exemplary residential routers 60 and 60.$n$ described below may be considered as conventional DSL routers with additional functions. Therefore, residential router 60 may comprise at least one first access interface 62, and residential router 60.$n$ may comprise at least one first access interface

62.*n*. The first access interfaces 62 and 62.*n* can be implemented as xDSL access interfaces each including a physical xDSL connector.

The exemplary telecommunication system 10 may include at least two customer networks 50 and 51, wherein customer network 50 includes the residential router 60.*n* and at least one user terminal 30, which can be connected to a terminal interface 64.*n* of residential router 60.*n*. For example, the terminal interface 64.*n* may comprise a physical connector, e.g. an Ethernet-based connector or a Wi-Fi-based connector. It is noted that a plurality of communication interfaces can be implemented on the residential router 60.*n*.

Similarly, customer network 51 may include the residential router 60 as well as at least one user terminal 70, which can be connected to a terminal interface 64 of the residential router 60. For example, the terminal interface 64 may comprise a physical connector, e.g. an Ethernet-based connector or a Wi-Fi-based connector. It is noted that a plurality of terminal interfaces can be implemented on the residential router 60. The user terminal 30 and the user terminal 70 can be implemented as a PC, a mobile phone or any other user device. It should be noted that the residential routers 60 and 60.*n* may be connected to each other via a community link 40 to form a residential router community. In other words, the residential router 60 and the residential router 60.*n* are assigned to different customers or customer networks 51 and 50, respectively. A plurality of such residential routers can be interconnected to form a meshed residential router community.

Therefore, residential router 60 comprises a second access interface 61, called community interface, which is configured to receive data packets, which may be called non-local data packets, from and to transmit data packets, which may be called local data packets, to another residential router, for example residential router 60.*n* Similarly, residential router 60.*n* comprises a first access interface 61.*n*, called community interface, which is configured to receive non-local data packets from and transmit local data packets to another residential router, for example residential router 60. It is noted that local data packets may define first data traffic, wherein non-local data packets may define second data traffic. Each of the community interfaces 61 and 61.*n* can comprise a physical connector, e.g., based on a Wi-Fi or Powerline Communication technology, so that the community link 40 can be realized as a WiFi-based or Powerline Communication based connection.

In a preferred embodiment, residential router 60 may be configured to select local data packets provided by user terminal 70 and transmit them via its second access interface 61 and the community link 40 to the residential router 60.*n* which may be configured to transmit these local data packets selected by the residential router 60 as non-local data packets to the termination point 100. To do this the residential router 60 may use, for example, the IP address of the residential router 60.*n*. In a similar manner, residential router 60.*n* may be configured to select local data packets provided by user terminal 30 and transmit them via its second access interface 61.*n* and the community link 40 to the residential router 60, which may be configured to transmit these local data packets selected by the residential router 60.*n* as non-local data packets to the termination point 100. To do this the residential router 60.*n* may use, for example, the IP address of the residential router 60.

Both residential router 60 and residential router 60.*n* are connected to a first access network 90 via the first access interfaces 62.*n* and 62, respectively, to transmit and receive data traffic in the form of data packets. In the present case, the first access network 90 is a fixed access network, namely an xDSL access network.

According to a preferred embodiment, a third access interface 63.*n* may be optionally implemented on residential router 60.*n*, wherein a third access interface 63 can be optionally implemented on residential router 60. For example, each of the third access interfaces 63 and 63.*n* may be implemented each as a physical cellular WAN-based access interface, such as an LTE-based access interface. As a result, the exemplary residential routers 60 and 60.*n* may be configured to get access to the termination point 100 and a data network 120, respectively, also via a mobile radio access network 80, which may be a LTE-based access network. The data network 120 is preferably the Internet.

It is to be noted that, with respect to residential routers 60 and 60.*n*, first data traffic, which includes local data packets, relates to data traffic which is generated by a user terminal and transmitted by the residential router which the user terminal is connected to, wherein second data traffic, which includes non-local data packets, is generated by a user terminal connected to a first residential router, wherein the second data traffic is transmitted from the first residential router to another residential router to be transmitted via the access network 80 and/or 90. For example: Data traffic or data packets generated by the user terminal 70, which shall be transmitted via the xDSL-based access interface 62 and/or the LTE-based access interface 63 to the termination point 100 are called first data traffic and local data packets, respectively. Data traffic or data packets generated by the user terminal 30, forwarded via community access interface 61.*n* to communication interface 61 of the residential router 60 and then transmitted by the residential router 60 via access interface 62 and/or access interface 63 to the termination point 100 are referred to as second data traffic and non-local data packets, respectively.

As shown in FIG. 1, the termination point 100 terminates the fixed access network 90 and, if used, the mobile radio access network 80. The termination point 100 operates preferably as an access aggregation point, which can belong to or be connected to a backbone network 110 or the data network 120 and thus to an operator providing the respective services and functions. Therefore, the termination point 100, which is preferably implemented as a device or a physical server including software, can be called an operator network device.

Figure 2A:
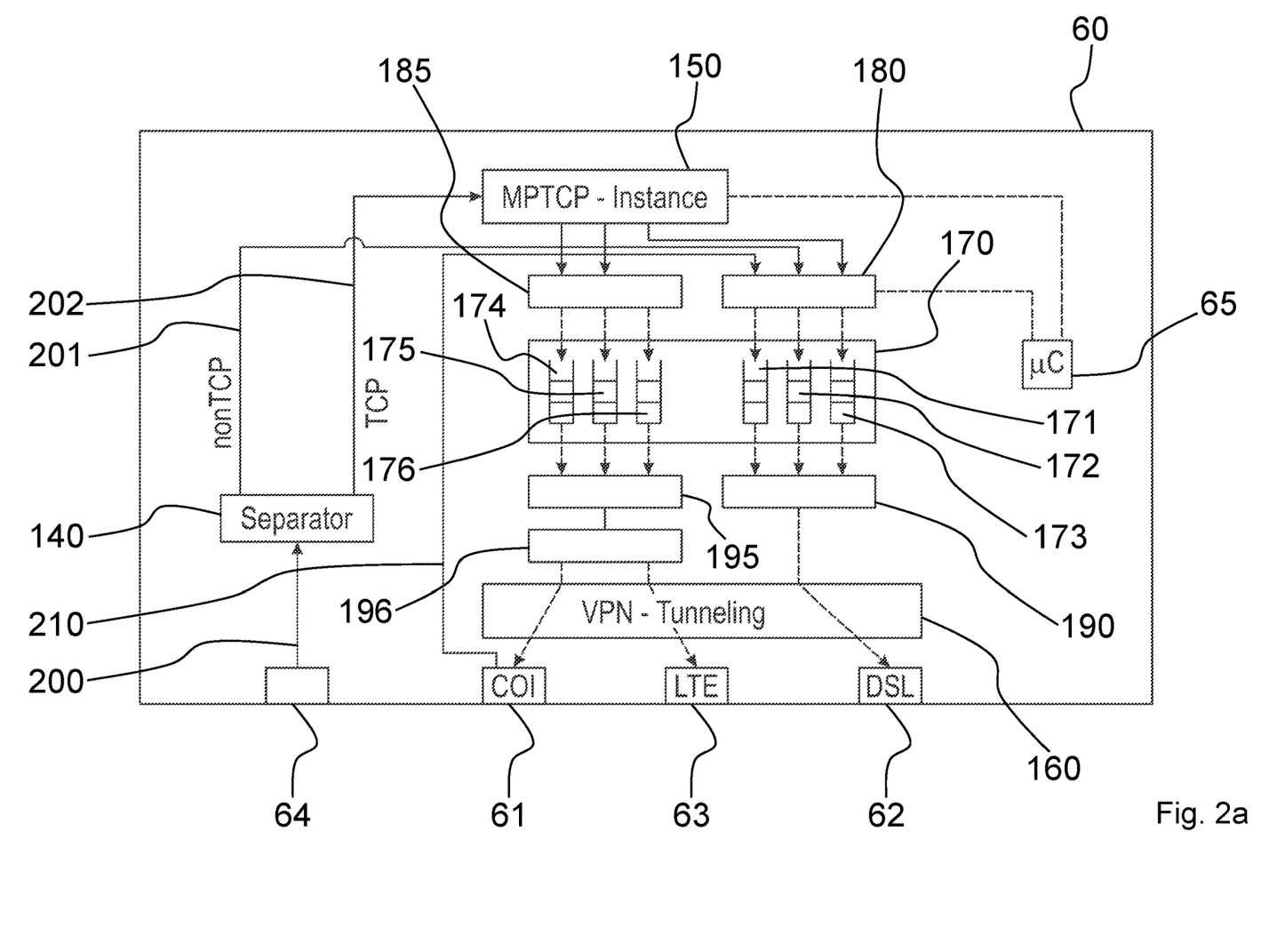
FIG. 2a shows a block diagram of one of the exemplary residential routers shown in FIG. 1.
Figure 2B:
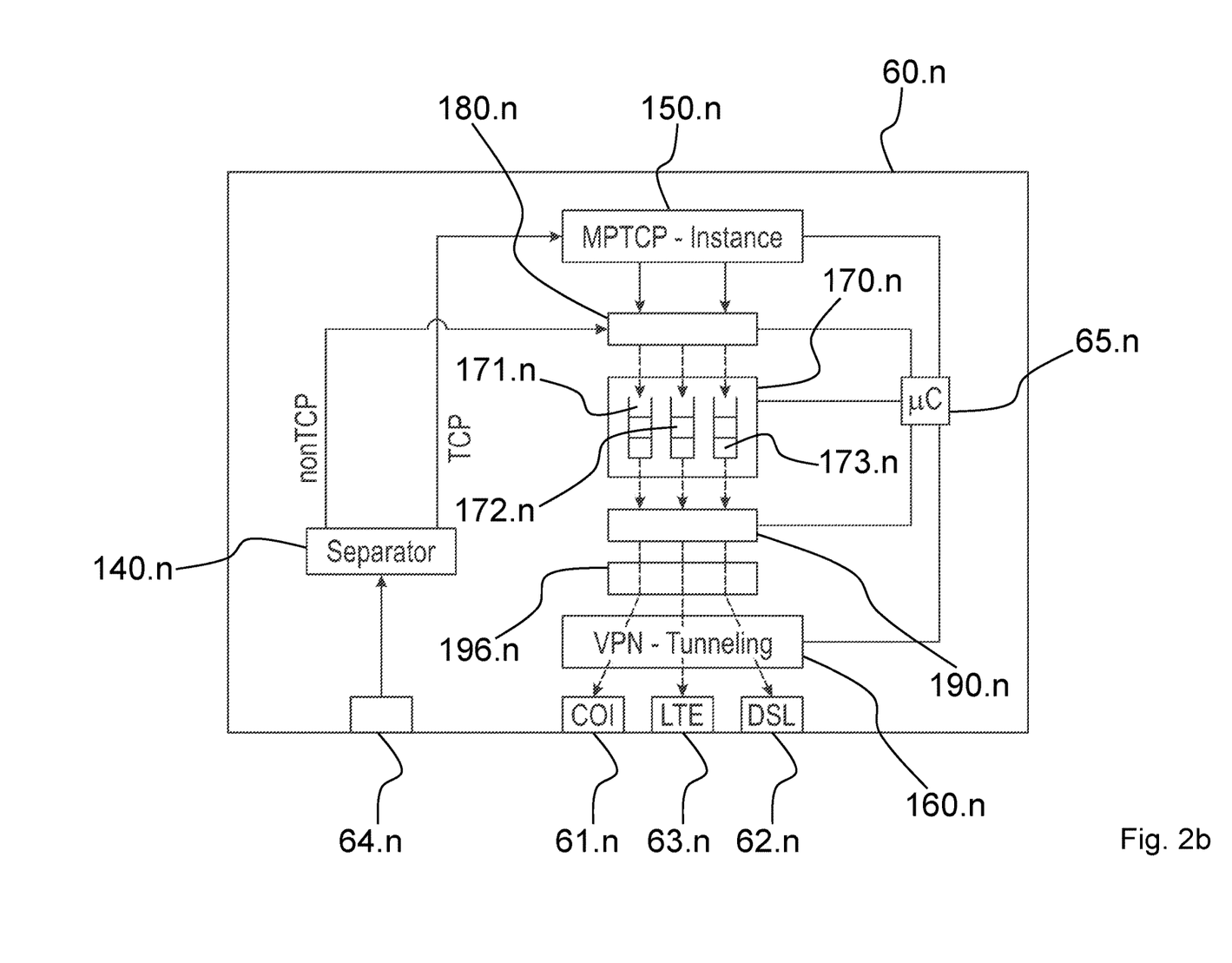
FIG. 2b shows a block diagram of another exemplary residential router shown in FIG. 1.

Referring now to FIG. 2*a*, the exemplary residential router 60 is described in detail. It should be noted that both residential router 60 and residential router 60.*n* shown in FIGS. 1 and 2*b* can be identically or similar implemented. Thus, the following illustration of residential router 60 may also be applicable to residential router 60.*n*, which, however, is illustrated in FIG. 2*b* in a different way.

In FIG. 2*a*, the terminal interface 64, the community interface 61 (also called second access interface), the LTE-based access interface 63 (also called the third access interface), and the xDSL-based access interface 62 (also called the first access interface) are depicted by way of example. As shown in FIG. 1, the user terminal 70 can be connected to the terminal interface 64.

Furthermore, the residential router 60 may comprise a data memory or data memory system 170 and at least one control unit 65 connectable to the data memory 170. The control unit 65 can be implemented as a micro controller or micro processor.

The control unit 65 may be configured i) to execute first instructions, stored on the residential router 60, to store, on the data memory 170, first data traffic including local data packets received at the terminal interface 64 in a first transmission queue 171, second data traffic including non-local data packets received at the second access 61 in a second transmission queue 172 and third data traffic preferably including metadata packets in a third transmission queue 173, wherein different priorities are assigned to the first transmission queue 171, the second transmission queue 172 and the third transmission queue 173, ii) to execute second instructions stored on the residential router 60 to read out the first data traffic (i.e. the local data packets), the second data traffic (i.e. the non-local data packets), and the third data traffic (i.e. the metadata packets) stored on the data memory 170 according to the priority assigned to the first transmission queue 171, the second transmission queue 172 and the third transmission queue 173, and preferably iii) to execute third instructions stored on the residential router 60 to transmit, via the xDSL-based access interface 62, the local data packets, the non-local data packets and the metadata packets in the order as read out.

It should be noted that the first access interface 62, the data memory 170 and the at least one control unit 65 may define a data traffic control device.

The first, second and third instructions can be stored on the data memory 170 or in a separate data memory of the residential router 60.

For example, a priority 2 is assigned to the first transmission queue 171, the lowest priority 3 is assigned to transmission queue 172 and the highest priority is assigned to transmission queue 173. This guarantees that if metadata packets (i.e. third data traffic), local data packets (i.e. first data traffic), and non-local data packets (i.e. second data traffic) are stored on the data memory 170 in the respective transmission queues, the metadata packets are transmitted first, followed by the local data packets, and finally by the non-local data packets. The metadata packets may include signaling information configured to establish multipath connections and/or signaling information to establish virtual private network (VPN) tunnel connections. The metadata packets are preferably generated and provided by the residential router 60.

The first instructions may be part of a software module 180, which may be configured to identify, if executed by the control unit 65, first data traffic (i.e. local data packets generated by the user terminal 70), second data traffic (i.e. non-local data packets generated for example by user terminal 30), and third data traffic (i.e. metadata packets provided by the residential router 60) and, according to a chosen implementation, to assign to each data packet of the first, second and third data traffic in dependence of its traffic class the respective priority, so that each data packet can be stored under control of the control unit 65 in the respective transmission queue. This step is known as enqueueing. The traffic classes refer to first data traffic (i.e. local data packets), second data traffic (i.e. non-local data packets), and third data traffic (i.e. metadata packets).

The second and third instructions may be part of a further software module 190, which may be further configured to perform, if executed by the control unit 65, a traffic shaping to limit, for example, the data transmission rate with respect to the DSL access interface 62 to preferably 16 Mbps.

In a preferred embodiment, a multipath transport protocol instance 150 can be installed on the residential router 60. The control 65 unit may be configured to execute the multipath transport protocol instance on the first data traffic (i.e. local data packets received at the terminal interface 64) and/or on the third data traffic (i.e. metadata packets) to decide, in dependence of at least one predefined transmission rule, whether the local data packets and/or the metadata packets are to be transmitted via the first access interface 62 and/or via the second access interface 61. This can be achieved, for example, by labeling each data packet of the first and third data traffic with a respective identification indicating the respective community access interface 61 and/or xDSL-based access interface 62. It should be noted that, in a preferred embodiment, the second data traffic (i.e. non-local data packets) are only transmitted via the xDSL access network 62.

It is to be noted that the multipath transport protocol instance 150 can be based on the Multipath Transmission Control Protocol (MPTCP), wherein the multipath capable data packets can be TCP data packets. The at least one predefined transmission rule can be based on a path cost metric and/or a round trip time associated to the access interfaces used and/or or any other rule to select an access interface, for example xDSL-based access interface 62 and/or community interface 61 and/or LTE-based access interface 63 for transmitting the local data packets and/or metadata packets. Furthermore, it is noted that the multipath transport protocol instance 150 may comprise a multipath scheduler, e.g. a known MPTCP scheduler as well as a known TCP-MPTCP converter. The TCP-MPTCP converter is configured to convert an uplink TCP session, initiated by the user terminal 70, into a MPTCP session and to convert a downlink MPTCP session received at the residential router 60 into a TCP session destined for the user terminal 70.

In order to process multipath capable local data packets or non-multipath capable local data packets received, for example, from the user terminal 70 or another user device at the terminal interface 64, a data traffic separation module 140 can be installed on the residential router 60. It should be noted that the data traffic separation module 140 may comprise a data traffic separation algorithm. Thus, the control unit 65 may be further configured to execute the data traffic separation algorithm to determine whether the local data packets received at the terminal interface 64 are multipath capable local data packets or non-multipath capable local data packets. Furthermore, the data traffic separation algorithm 140 may be configured to cause, if executed by the control unit 65, the residential router 60 to store, in dependence of a chosen implementation, the detected non-multipath capable local data packets on the data memory 170 in the first transmission queue 171, wherein the detected multipath capable local data packets are forwarded to and processed by the multipath transport protocol instance 150.

In order to enhance data throughput and resilience of the telecommunication system 10, the third access interface 63 as mentioned above can be implemented on the residential router 60, which is configured to transmit and/or receive local data packets, and/or metadata packets and/or non-local data packets, i.e. first, second and/or third data traffic, via the second access network 80. The control unit 65 is configured to execute the multipath transport protocol instance 150 on the local data packets received at the terminal interface 64 and/or on the metadata packets to decide, in dependence of at least one predefined transmission rule, whether the local data packets and/or the metadata packets are to be transmitted via the xDSL-based access interface 62 and/or the community access interface 61 and/or the LTE-based access interface 63.

In a preferred embodiment, the control unit 65 is configured i) to execute fourth instructions, stored on the residential router 60, to store, on the data memory 170, first local data packets of the first data traffic to be transmitted via the third (LTE-based) access interface 63 in a fourth transmission queue 174, second local data packets of the first data traffic to be transmitted via the second (xDSL-based) access interface 61 in a fifth transmission queue 175 and the metadata packets to be transmitted via the second access interface 61 and/or the third access interface 63 in a sixth transmission queue 176, wherein different priorities are assigned to the fourth, fifth and sixth transmission queue, ii) to execute fifth instructions stored on the residential router 60 to read out the local data packets to be transmitted via the third access interface 63, the local data packets to be transmitted via the second (community) access interface 61 and the metadata packets to be transmitted via the second (community) access interface 61 and/or the third (LTE-based) access interface 63 and stored in the sixth transmission queue 176 according to the priority assigned to the fourth transmission queue 174, the fifth transmission queue 175 and the sixth transmission queue 176, and iii) to execute sixth instructions stored on the residential router 60 to transmit, via the second (community) access interface 61 and/or the third (LTE-based) access interface 63 the local data packets and the metadata packets in the order as read out.

The first instructions are further configured to store, if executed by the control unit 65, only these local data packets of the first data traffic, which are to be transmitted via the first (xDSL-based) access interface 62, on the data memory 170 in the first transmission queue 171 and/or only these metadata packets of the third data traffic, which are to be transmitted via the first (xDSL-based) access interface 62, on the data memory 170 in the third transmission queue 173.

The fourth instructions may be part of a software module 185, which may be configured to identify, if executed by the control unit 65, local data packets generated by the user terminal 70 and metadata packets provided by the residential router 60 and, according to a chosen implementation, to assign to each data packet of the first and third data traffic the respective priority in dependence of its traffic class and in dependence of the access interface to be used, so that each data packet, i.e. local or metadata packet, can be stored under control of the control unit 65 in the respective transmission queue 174, 175 or 176.

It is to be noted that the access interface to be used by a respective data packet can be selected and assigned to the respective data packet by the multipath transport protocol instance 150, which operates in this case as an access classifier.

The fifth and sixth instructions may be part of a further software module 195. In a preferred embodiment, the fifth instructions are configured to read out, if executed by the control unit 65, the data memory 170 with respect to the fourth, fifth and sixth transmission queue 174-176 with an adjustable data rate, e.g. 50 Mbps. Preferably, the sixth instructions are configured to cause, if executed by the control unit, the control unit 65 and the residential router 60, respectively, to transmit the local data packets stored on the data memory 170 in the fourth transmission queue 174 and/or the fifth transmission queue 175 and the metadata stored on the data memory 170 in the sixth transmission queue 176 completely via the second (community) access interface 61, if the second access interface 61 is currently able to transmit data at the adjustable data rate. In this case, the software module 195 can be considered to operate as a traffic shaper and a dequeueing module.

In addition, an access de-multiplexer 196 can be implemented on the residential router 60, which is configured to distribute the metadata packets and/or the first local data packets and/or the second local data packets according to the respective access interface selected by the multipath transport protocol instance 150 and assigned to the respective data packet.

As mentioned above, the data traffic separation module 140 may comprise a data traffic separation algorithm, which can be installed on the residential router 60. Thus, the control unit 65 may be further configured to execute the data packet separation algorithm to determine whether the local data packets received at the terminal interface 64 are multipath capable local data packets or non-multipath capable local data packets. Furthermore, residential router 60 may be configured to store, in dependence of a chosen implementation, the detected non-multipath capable local data packets on the data memory 170 in the first transmission queue 171 as shown in FIG. 2a, or in the fourth transmission queue 174 or in the fifth transmission queue 175. For example, non-multipath capable local data packets can be sent from data traffic separation module 140 via link 201 to software module 180 which causes, if executed by the control unit 65, the residential router 60 to store the detected non-multipath capable local data packets in the first transmission queue 171.

It is to be noted that metadata packets may include signaling information configured to establish multipath connections and/or VPN tunneling connections between the residential router 60 and the operator network device 100. Therefore, a VPN tunneling software module 160 executable by the control unit 65 may be installed on the residential router 60. The VPN tunneling software module 160 is configured to encapsulate, in a known manner, data packets to be transmitted via the first access interface 62 and/or the third access interface 63. Instead of establishing a tunnel connection between the residential routers 60 and 60.*n* and the operator network device 100, their IP addresses may be used for communication between them.

It is to be noted that the residential router 60 can be configured to perform a traffic classification in that a specific information can be put into the header of each data packet to be transmitted. The specific information may include a source and/or destination IP address, a port address or any other header information or extension helping the router 60 in identifying a data packet as a metadata packet, a local data packet or a non-local data packet, i.e. in identifying first, second and third data traffic.

Referring now to FIG. 2b, the exemplary residential router 60.*n* is described in detail. In particular, residential router 60.*n* differs from residential router 60 in that it uses three transmission queues instead of six transmission queues. However, as already mention above, residential routers 60 and 60.*n* can be implemented in a similar or identical way.

In FIG. 2b, the terminal interface 64.*n*, the community interface 61.*n*, also called the second access interface, the exemplary LTE-based access interface 63.*n*, also called the third access interface, and the exemplary xDSL access interface 62.*n*, also called the first access interface, are depicted by way of example. As shown in FIG. 1 the user terminal 30 can be connected to the terminal interface 64.*n*.

Furthermore, the residential router 60.*n* may comprise a data memory or data memory system 170.*n* and at least one control unit 65.*n* connectable to the data memory 170.*n*. The control unit 65.*n* can be implemented as a micro controller or micro processor.

The control unit 65.*n* may be configured i) to execute first instructions, stored on the residential router 60.*n*, to store, on the data memory 170.*n*, first data traffic including local data packets received at the terminal interface 64.*n* in a first transmission queue 171.*n*, second data traffic including non-local data packets received for example from residential router 60 at the second access 61.*n* in a second transmission queue 172.*n* and third data traffic including metadata packets in a third transmission queue 173.*n*, wherein different priorities are assigned to the first transmission queue 171.*n*, the second transmission queue 172.*n* and the third transmission queue 173.*n*, ii) to execute second instructions stored on the residential router 60.*n* to read out the first data traffic (i.e. the local data packets), the second data traffic (i.e. the non-local data packets), and the third data traffic (i.e. the metadata packets) stored on the data memory 170.*n* according to the priority assigned to the first transmission queue 171.*n*, the second transmission queue 172.*n* and the third transmission queue 173.*n*, and preferably iii) to execute third instructions stored on the residential router 60.*n* to transmit, via the first (xDSL-based) access interface 62.*n*, the local data packets, the non-local data packets and the metadata packets in the order as read out.

It should be noted that the first (xDSL-based) access interface 62.*n*, the data memory 170.*n* and the at least one control unit 65.*n* may define a data traffic control device.

The first, second and third instructions can be stored on the data memory 170.*n* or in a separate data memory of the residential router 60.*n*.

For example, a priority 2 is assigned to the first transmission queue 171.*n*, the lowest priority 3 is assigned to transmission queue 172.*n* and the highest priority is assigned to transmission queue 173.*n*. This guarantees that if metadata packets, i.e. third data traffic, local data packets, i.e. first data traffic, and non-local data packets, i.e. second data traffic, are stored on the data memory 170.*n* in the respective transmission queues, the metadata packets are transmitted first, followed by the local data packets and finally by the non-local data packets. The metadata packets may include signaling information configured to establish multipath connections and/or signaling information to establish VPN tunnel connections. The metadata packets are preferably generated and provided by the residential router 60.*n*.

The first instructions may be part of a software module 180.*n*, which may be configured to identify, if executed by the control unit 65.*n*, first data traffic (i.e. local data packets) generated by the user terminal 30, second data traffic (i.e. non-local data packets generated, for example, by user terminal 70), and third data traffic (i.e. preferably metadata packets provided by the residential router 60.*n*) and, according to a chosen implementation, to assign to each data packet of the first, second and third data traffic the respective priority in dependence of its traffic class, so that each data packet can be stored under control of the control unit 65.*n* in the respective transmission queue. This step is known as enqueueing. The traffic classes preferably refer to first data traffic (i.e. local data packets), second data traffic (i.e. non-local data packets), and third data traffic (i.e. metadata packets).

The second and third instructions may be part of a further software module 190.*n*, which may be further configured to perform, if executed by the control unit 65.*n*, a traffic shaping to limit, for example, the data transmission rate with respect to the DSL access interface 62.*n* to preferably 16 Mbps.

In a preferred embodiment, a multipath transport protocol instance 150.*n* can be installed on the residential router 60. The control unit 65.*n* may be configured to execute the multipath transport protocol instance 150.*n* on the first data traffic (i.e. local data packets received at the terminal interface 64.*n*) and/or on the third data traffic (i.e. preferably metadata packets) to decide, in dependence of at least one predefined transmission rule, whether the local data packets and/or the metadata packets are to be transmitted via the first (xDSL-based) access interface 62.*n* and/or via the second (community) access interface 61.*n*. This can be achieved, for example, by labeling each data packet of the first and third data traffic with a respective identification indicating the respective access interface 61.*n* and/or 62.*n*. It should be noted that, in a preferred embodiment, the second data traffic (i.e. non-local data packets) are only transmitted via the xDSL access network 62.*n*.

It is to be noted that the multipath transport protocol instance 150.*n* can be based on the Multipath Transmission Control Protocol (MPTCP), wherein the multipath capable data packets can be TCP data packets. The at least one predefined transmission rule can be based on a path cost metric and/or a round trip time associated to the access interfaces used and/or any other rule to select an access interface, for example xDSL-based access interface 62.*n* and/or community interface 61.*n* and/or LTE-based access interface 63.*n* for transmitting the local data packets and/or metadata packets. Furthermore, it is noted that the multipath transport protocol instance 150.*n* may comprise a multipath scheduler, e.g. a known MPTCP scheduler as well as a known TCP-MPTCP converter. The TCP-MPTCP converter is configured to convert an uplink TCP session, initiated by the user terminal 30, into a MPTCP session and to convert a downlink MPTCP session received at the residential router 60.*n* into a TCP session destined for the user terminal 30.

In order to enhance data throughput and resilience of the telecommunication system 10, the third (LTE-based) access interface 63.*n* as mentioned above can be implemented on the residential router 60.*n*, which is configured to transmit and/or receive local data packets, and/or metadata packets and/or non-local data packets, i.e. first, second and/or third data traffic, via the second access network 80. The control unit 65.*n* may be configured to execute the multipath transport protocol instance 150.*n* on the local data packets, i.e. first data traffic, received at the terminal interface 64.*n* and/or on the metadata packets, i.e. third data traffic, to decide, in dependence of at least one predefined transmission rule, whether the local data packets and/or the metadata packets are to be transmitted via the first (xDSL-based) access interface 62.*n* and/or the second (community) access interface 61.*n* and/or the third (LTE-based) access interface 63.*n*.

The first instructions are further configured to store, if executed by the control unit 65.*n*, the local data packets of the first data traffic, which are to be transmitted via the first (xDSL-based) access interface 62.*n*, and/or the local data packets of the first data traffic, which are to be transmitted via the second (community) access interface 61.*n*, and/or the local data packets of the first data traffic, which are to be transmitted via the third (LTE-based) access interface 63.*n*, on the data memory 170.*n* in the first transmission queue 171.*n* and, if available, the metadata packets of the third data traffic, which are to be transmitted via the first (xDSL-based) access interface 62.*n*, and/or the metadata packets of the third data traffic, which are to be transmitted via the second access interface 61.*n*, and/or the metadata packets of the third data traffic, which are to be transmitted via the third access interface 63.*n*, on the data memory 170.*n* in the third transmission queue 173.*n*.

Moreover, the first instructions may be configured to identify, if executed by the control unit 65.*n*, local data packets generated by the user terminal 30 and metadata packets provided by the residential router 60.*n* and, according to a chosen implementation, to assign to each data packet of the first and third data traffic the respective priority in dependence of its traffic class and in dependence of the access interface to be used, so that each data packet, i.e. a local data packet or a metadata packet, can be stored under control of the control unit 65.*n* in the respective transmission queue 171.*n* or 173.*n*.

It is to be noted that the access interface to be used by a respective data packet can be selected and assigned to the respective data packet by the multipath transport protocol instance 150.*n*, which operates in this case as an access classifier.

In a preferred embodiment, the second instructions are configured to read out, if executed by the control unit 65.*n*, the data memory 170 with respect to the first transmission queue 171.*n* storing local data packets and the third transmission queue 173.*n* storing metadata packets with an adjustable data rate, e.g. 50 Mbps. Preferably, the third instructions are configured to cause, if executed by the control unit 65.*n*, the residential router 60.*n* to transmit the local data packets stored in the first transmission queue 171.*n* and the metadata stored in the third transmission queue 173.*n* completely via the second access interface 61.*n*, if the second (community) access interface 61.*n* is currently able to transmit data at the adjustable data rate. In this case, the software module 190.*n* can be considered to operate as a traffic shaper and a dequeueing module.

In addition, an access de-multiplexer can be implemented on the residential router 60, which is configured to distribute the metadata packets and/or the local data packets according to the respective access interface selected by the multipath transport protocol instance 150.*n* and assigned to the respective data packet. The access de-multiplexer may be included in the software module 190.*n*.

In order to process multipath capable local data packets and non-multipath capable local data packets received from the user terminal 30 at the terminal interface 64.*n*, a data traffic separation module 140.*n* may be installed on the residential router 60.*n*. The data traffic separation module 140.*n* may be configured to determine whether the data packets received at the terminal network interface 64.*n* are multipath capable data packets, i.e. multipath capable data traffic, or non-multipath capable data packets, i.e. non-multipath capable data traffic. In particular, the data traffic separation module 140.*n* may be configured to cause with respect to non-multipath capable data traffic the residential router 60.*n* to bypass the multipath transport instance 150.*n* and to transmit according a chosen implementation the detected non-multipath capable data packets via the first access interface 62.*n* or the second access 61.*n* or the third access interface 63.*n*. Preferably, non multipath capable data packets are stored in the first transmission queue 171.*n*.

Furthermore, the data traffic separation module 140.*n* may be configured to cause, if executed by the control unit 65.*n*, the residential router 60.*n* to forward multipath capable local data packets to the multipath transport protocol instance 150.*n* for further processing.

For example, non-multipath capable local data packets can be sent from data traffic separation module 140.*n* to software module 180.*n* which causes, if executed by the control unit 65.*n*, the residential router 60.*n* to store the detected non-multipath capable local data packets in the first transmission queue 171.*n*.

It is to be noted that metadata packets may include signaling information configured to establish multipath connections and/or VPN tunneling connections between the residential router 60.*n* and the operator network device 100. Therefore, a VPN tunneling software module 160.*n* executable by the control unit 65.*n* may be installed on the residential router 60.*n*. The VPN tunneling software module 160.*n* is configured to encapsulate, in a known manner, data packets to be transmitted via the first (xDSL-based) access interface 62.*n* and/or the third (LTE-based) access interface 63.*n*. Instead of establishing a tunnel connection between the residential router 60.*n* and the operator network device 100, their IP addresses may be used for communication between them.

It is to be noted that the residential router 60.*n* can be configured to perform a traffic classification in that a specific information can be put into the header of each data packet to be transmitted. The specific information may include a source and/or destination IP address, a port address or any other header information or extension helping the router 60.*n* in identifying a data packet as a metadata packet, a local data packet or a non-local data packet, i.e. in identifying first, second and third data traffic.

Figure 3:
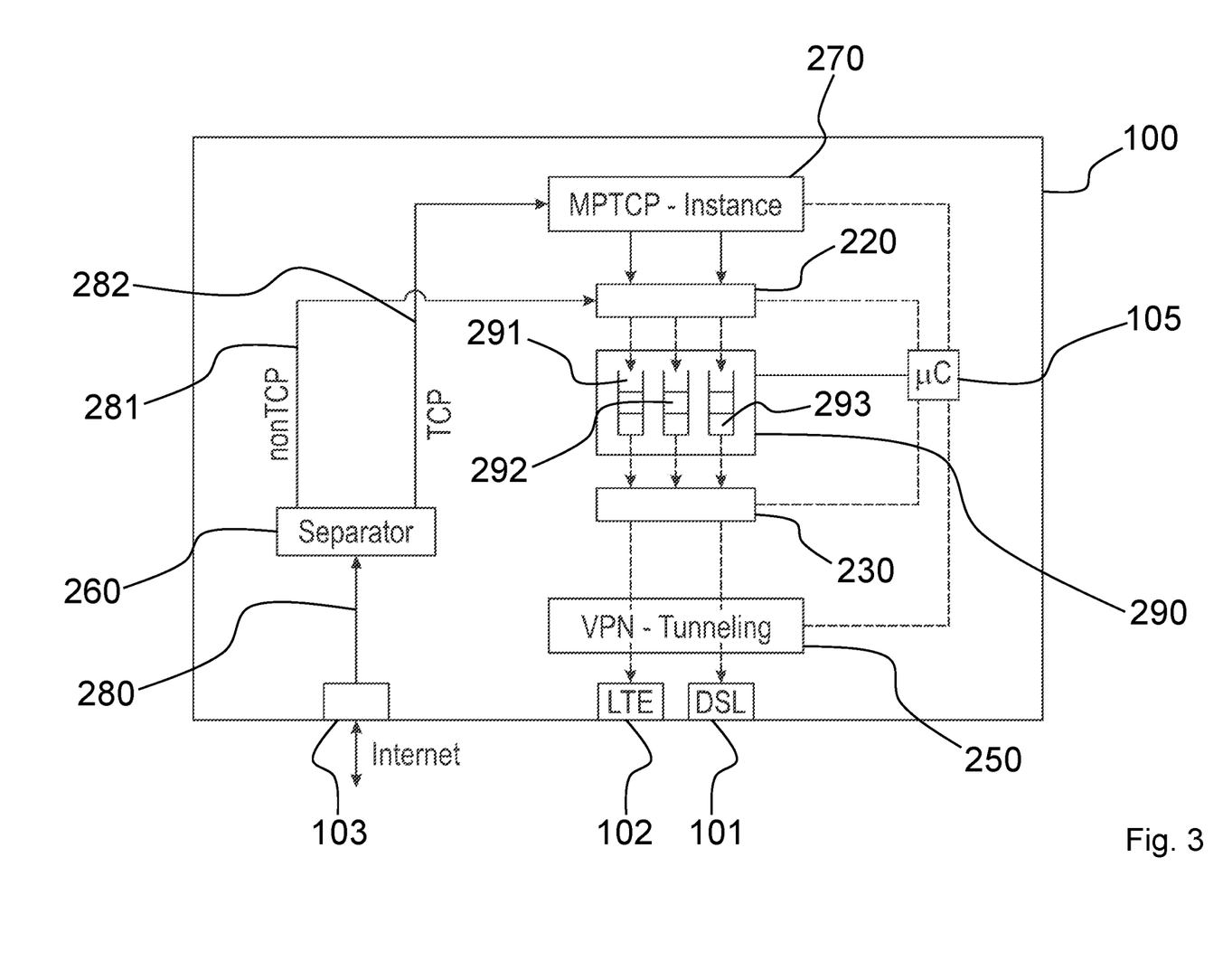
FIG. 3 shows a block diagram of the exemplary operator network device shown in FIG. 1.

FIG. 3 depicts a block diagram of the exemplary operator network device 100 in detail.

For example, the operator network device 100 may include a first access interface 101 terminating a first access network, which is, for example, the DSL-based access network 90. Optionally, a second access interface 102 may be implemented on the operator network device 100, wherein the second access interface 102 terminates a second access network, in the present case the mobile radio access network 80. Moreover, a network interface 103 may be implemented on the operator network device 100 which can be connected to the Internet 120 and in particular to an application server 121 located in the Internet 120.

It is to be noted that the first access interface 101 can be a physical or virtual xDSL-based access interface and the second access interface 102 can be a physical or a virtual cellular WAN-based-based access interface, in particular a LTE-based access interface.

The operator network device 100 is preferably adapted to control different data traffic to be transmitted to at least one residential router, e.g. the residential routers 60 and/or 60.*n*.

In addition, a data memory 290 and at least a control unit 105, e.g. a micro controller or micro processor, is implemented on the network device 100. The control unit 105 may be configured i) to execute first instructions, stored on the operator network device 100, to store, on the data memory 290, first data traffic (i.e. first local data packets) destined for a first residential router, e.g. residential router 60 in a first transmission queue 291, second data traffic (i.e. second local data packets) destined for the first residential router 60, but which are to be transmitted via a second residential router, e.g. residential router 60.*n*, to the first residential router 60, in a second transmission queue 292, and third data traffic (e.g. metadata packets) in a third transmission queue 293, wherein different priorities are assigned to the first transmission queue 291, the second transmission queue 192 and the third transmission queue 293, ii) to execute second instructions stored on the operator network device 100 to read out the first local data packets, the second local data packets and the metadata packets stored on the data memory 290 according to the priority assigned to the first transmission queue 291, the second transmission queue 292 and the third transmission queue 293, and preferably iii) to execute third instructions stored on the operator network device 100 to transmit, via the first (xDSL-based) access interface 101, the first local data packets, the second local data packets and the metadata packets in the order as read out.

It should be noted that the first access interface 101, the data memory 290 and the at least one control unit 105 may define a data traffic control device.

The first, second and third instructions can be stored on the data memory 290 or on a separate data memory of the network device 100.

For example, a priority 2 is assigned to the first transmission queue 291, the lowest priority 3 is assigned to transmission queue 292 and the highest priority 1 is assigned to transmission queue 293. This guarantees that metadata packets, first local data packets and second local data packets are stored on the data memory 290 in different transmission queues. The metadata packets are transmitted first, followed by the first local data packets and finally by the second local data packets. Metadata packets may include signaling information configured to establish multipath connections and/or to establish VPN tunnel connections via the fixed access network 90 or the mobile radio access network 80.

The first instructions may be part of a software module 220, which may be configured to identify, if executed by the control unit 105, first local data packets destined for the residential router 60, second local data packets also destined for the residential router 60 but to be routed via the residential router 60.n to the residential router 60, and metadata packets provided by the network device 100 and, optionally, to assign to each data packet in dependence of its traffic class the respective priority, so that each data packet of the first, second and third data traffic can be stored in the respective transmission queue. This step is known as enqueueing. The traffic classes preferably refer to first and second local data packets and metadata packets, i.e. to first, second and third data traffic.

The second and third instructions may be part of a further software module 230, which may be further configured to perform, if executed by the control unit 105, a traffic shaping to limit, for example, the data transmission rate with respect to the DSL access interface 101.

In order to enhance data throughput and resilience of the telecommunication system 10, the operator network device 100 may comprise the second access interface 102, e.g. the LTE-based access interface, which is configured to communicate via a second access network, e.g. the LTE-based access network 80, with at least one residential router, e.g. the residential router 60 and/or the residential router 60.n.

Furthermore, a multipath transport protocol instance 270 may be installed on the operator network device 100. The control unit 105 is further configured to execute the multipath transport protocol instance on the first local data packets, i.e. the first data traffic, and/or the second local data packets, i.e. the second data traffic, and/or on the metadata packets, i.e. the third data traffic, to decide, in dependence of at least one predefined transmission rule, whether the first local data packets and/or the second local data packets and/or the metadata packets are to be transmitted via the first (xDSL-based) access interface 101 and/or the second (LTE-based) access interface 102. This can be achieved, for example, by labeling each data packet of the first, second and third data traffic with a respective identification indicating the xDSL-based access interface 101 or the LTE-based access interface 102.

In addition, an access de-multiplexer can be implemented on the operator network device 100, which is configured to distribute the metadata packets and/or the first local data packets and/or the second local data packets to the respective access interface 101 and/or 102 selected by the multipath transport protocol instance 270. The access de-multiplexer may be included in the software module 230.

It is to be noted that the multipath transport protocol instance 270 can be based on the Multipath Transmission Control Protocol (MPTCP), wherein the multipath capable data packets can be TCP data packets. The at least one predefined transmission rule can be based on a path cost metric and/or a round trip time associated to the access interfaces used and/or to any other rule to select an access interface, for example access interface 101 and/or access interface 102 for transmitting first and/or second local data packets and/or metadata packets. Furthermore, it is noted that the multipath transport protocol instance 270 may comprise a multipath scheduler, e.g. a known MPTCP scheduler as well as a known TCP-MPTCP converter. The TCP-MPTCP converter is configured to convert an uplink TCP session received from the Internet 120 into a MPTCP session and to convert a MPTCP session received at the access interface 101 and/or at the access interface 102 into a TCP session destined for the Internet 120.

In order to process multipath capable local data packets and non-multipath capable local data packets received from the Internet 120 at the network interface 103, a data traffic separation module 260 may be installed on the operator network device 100. The data traffic separation module 260 may be configured to determine whether the data packets received at the network interface 103 are multipath capable data packets, i.e. multipath capable data traffic, or non-multipath capable data packets, i.e. non-multipath capable data traffic. In particular, the data traffic separation module 260 may be configured to cause, with respect to non-multipath capable data traffic, the operator network device 100 to bypass the multipath transport instance 270 and to transmit the detected non-multipath capable data packets via the first access interface 101 or the second access 102 according to a chosen implementation. Furthermore, the data traffic separation algorithm 260 may be configured to cause, if executed by the control unit 65, the operator network device 100 to forward multipath capable local data packets via link 282 to the multipath transport protocol instance 270 for further processing as illustrated above.

It should be noted that the data traffic separation module 260 as well as the data traffic separation modules 140 and 140.n are preferably located on layer 4 of the ISO OSI reference model. Therefore, data traffic separation modules 260, 140 and 140.n, respectively, are configured to identify data packets as multipath capable or non-multipath capable data packets in dependence of the transport layer protocol used to transmit the respective data packet.

It is to be noted that the operator network device 100 can be configured to perform a traffic classification in that a specific information can be put into the header of each data packet to be transmitted. The specific information may include a source and/or destination IP address, a port address or any other header information or extension helping the operator network device in classifying a data packet as a metadata packet, a first local data packet or a second local data packet, i.e. in classifying first, second and third data traffic. For example, the operator network device 100 can be informed of the current workload of each access interface of the residential routers 60 and 60.*n* and decide thereon which data packets, which are not metadata packets, are to be handled as first or second local data packets.

Furthermore, the operator network device 100 and the control unit 105, respectively, may be configured to execute a VPN tunnel software module 230 installed on the operator network device 100 to establish, for example, a VPN tunnel 92 from access interface 101 via the DSL access network 90 to the residential router 60.

Now the operation of the exemplary telecommunication system 10 of FIG. 1 is illustrated in connection with some exemplary scenarios.

1. Scenario

It is assumed that both user terminal 70 and user terminal 30 are configured to generate TCP data packets. It is further assumed that residential router 60.*n* is about to transmit at least some data packets provided by user terminal 30 and to be transmitted via the operator network device 100 to the Internet 120 via the community link 40 to residential router 60. These data packets are considered as non-local data packets by residential router 60. Furthermore, it is assumed that local data packets provided by the user terminal 70 and metadata packets provided by the residential router 60 are to be transmitted via the operator network device 100 to the Internet 120. In addition, it is assumed that residential router 60 and in particular the MPTCP instance 150 know that the DSL access interface 62 is the cheapest access interface and currently available to transmit all data packets.

As a result, the local TCP data packets received at terminal interface 64 are forwarded by the data packet separation module 140 via path 202 to the MPTCP instance 150. Now, the control unit 65 may cause, if executing the MPTCP instance 150 and the software module 180 on the local TCP data packets received at terminal interface 64 and on the metadata packets, the residential router 60 to store the local TCP data packets in the transmission queue 171 and the metadata packets in transmission queue 173. In addition, the residential router 60 and preferably software module 180 is configured to identify the data packets provided by user terminal 30 and received at the community interface 61 as non-local data packets and to store these non-local data packets in transmission queue 172. These functions can be performed by the control unit 65 when executing the software module 180. Next, the residential router 60 may establish a VPN tunnel 92 from access interface 62 via the DSL access network 90 to the operator network device 100 by executing VPN tunnel software module 160 and transmit at first the metadata packets stored in transmission queue 173, later on the local data packets stored in transmission queue 171 and finally the non-local data packets stored in the transmission queue 172 to the operator network device 100 via the VPN tunnel 92. The operator network 100 is configured to forward the local data packets and the non-local data packets in a proper way to the Internet 120.

2. Scenario

Now it is assumed that operator device 100 stores data to be sent to residential routers. For example, first local data packets destined for the residential router 60 are stored in transmission queue 291, second local data packets destined for the residential router 60.*n*, but to be routed via residential router 60 to residential router 60.*n* are stored in transmission queue 292 and metadata packets are stored in transmission queue 293. It is to be noted that all local data packets have been received from the Internet 120 at network interface 103 and identified and classified by the operator network device 100 as first local data packets and second local data packets. Next, the operator network device 100 may establish a VPN tunnel 92 from access interface 101 via the DSL access network 90 to the residential router 60 by executing VPN tunnel software module 250. Later on, operator network device 100 transmits first the metadata packets stored in transmission queue 293, second the first local data packets stored in transmission queue 291 and finally the second local data packets stored in the transmission queue 292 to residential router 60. The residential router 60 is configured to forward the second local data packets destined for the residential router 60.*n* via the community link 40 to the residential router 60.*n*.

3. Scenario

Now it is assumed that DSL access interface 62 of residential router 60 is overloaded or defective, user terminal 70 is about to transmit TCP data packets to the residential router 60, and metadata packets are provided by the residential router 60, which are to be transmitted via the operator network device 100 to the Internet 120. In addition, it is assumed that residential router 60 and in particular the MPTCP instance 150 know that the DSL access interface is currently not able to transmit further data packets or data packets at all.

As a result, the local TCP data packets received at terminal interface 64 are forwarded by the data packet separation module 140 via path 202 to the MPTCP instance 150. Now the control unit 65 may cause, if executing the MPTCP instance 270 and the software module 220 on the local TCP data packets provided by user terminal 70 and on the metadata packets, the residential router 60 to store selected first local TCP data packets in the transmission queue 174, selected second local TCP data packets in transmission queue 175 and the metadata packets in transmission queue 176. In dependence of the implementation and current traffic measurements, MPTCP instance 270 may decide that the selected first data packets shall be transmitted via community interface 61, the selected second data packets shall be transmitted via LTE-based access interface 62 and the metadata packets shall be transmitted via the community interface 61 and/or the LTE-based access interface 63. Next, the residential router 60 may establish a VPN tunnel 82 from LTE-based access interface 63 via the LTE access network 80 to the operator network device 100 by executing VPN tunnel software module 160 and transmit first the metadata packets stored in transmission queue 176 via community interface 61 and/or LTE access interface 63, the selected first second the local data packets stored in transmission queue 174 via community interface 61 and finally the selected second data packets stored in the transmission queue 175 via the LTE access interface 63 to the operator network device 100. The residential router 60.*n* is configured to transmit the metadata packets and the selected first data packets received from residential router 60 for example via its first (xSDSL-based) access interface 62.*n* to the operator network 100.

At least some preferred aspects illustrated above are now summarized in connection with the FIGS. 1 to 3.

According to a first exemplary aspect at least one data traffic control device for controlling different data traffic is provided, which may comprise the following features:

a first access interface 62, 62.*n* and 101 configured to transmit data traffic via a first access network 90, a data memory 170, 170.*n* and 290, at least one control unit 65, 65.*n* and 105 configured i) to execute first instructions, stored on the data traffic control device, to store, on the data memory 170, 170.*n* and 290, first data traffic in a first transmission queue 171, 171.*n* and 291, second data traffic in a second transmission queue 172, 172.*n* and 292, and third data traffic in a third transmission queue 173, 173.*n* and 293, wherein different priorities are assigned to the first, second and third transmission queue, ii) to execute second instructions, stored on the data traffic control device, to read out the first data traffic, the second data traffic and the third data traffic stored on the data memory 170, 170.*n* and 290, according to the priority assigned to the first transmission queue 171, 171.*n* and 291, the second transmission queue 172, 172.*n* and 292, and the third transmission queue 173, 173.*n* and 293, and iii) to execute third instructions, stored on data traffic control device, to transmit, via the first access interface 62, 62.*n* and 101, the first data traffic, the second data traffic and the third data traffic in the order as read out, wherein the first data traffic, the second data traffic and the third data traffic each comprise a plurality of data packets.

According to a second exemplary aspect a residential router 60 for controlling different data traffic is provided, which may comprise the following features:

a data traffic control device as set forth above, a terminal interface 64 configured to receive first data traffic from a residential user terminal 70, a second access interface 61 configured to receive second data traffic from another residential router 60.*n*, the residential router 60 and the other residential router 60.*n* are assigned to different customers 50, 51 and may define a community or group of residential routers.

For example, the first data traffic may be referred to local data traffic provided by the residential user terminal 70 connectable to the residential router 60, the second data traffic may be referred to non-local data traffic provided by the other residential router 60.*n* and the third data traffic may be referred to metadata traffic provided by the residential router 60.

In order to increase data throughput and resilience, a multipath transport protocol instance 150 may be installed on the residential router 60, wherein the control unit 65 may be further configured to execute the multipath transport protocol instance 150 on the first data traffic received at the terminal interface 64 and/or on the third data traffic to decide, in dependence of at least one predefined transmission rule, whether the first data traffic and/or the third data traffic are each to be transmitted via the first access interface 62 and/or the second access interface 61.

In particular, the control unit 65 may be configured to a) execute the multipath transport protocol instance 150 on the first data traffic received at the terminal interface 64 to decide, in dependence of at least one predefined transmission rule, whether the first data traffic shall be transmitted via the first access interface 62 or the second access interface 61, or whether some of the data packets of the first data traffic shall be transmitted via the first access interface 62, whereas other data packets of the first data traffic shall be transmitted via the second access interface 61 and/or to execute the multipath transport protocol instance 150 on the third data traffic to decide, in dependence of at least one predefined transmission rule, whether the third data traffic shall be transmitted via the first access interface 62 or the second access interface 61, or whether some of the data packets of the third data traffic shall be transmitted via the first access interface 62, whereas other data packets of the third data traffic shall be transmitted via the second access interface 61.

In order to improve data throughput and resilience, a third access interface 63 may be implemented on the residential router 60, wherein the third access interface 63 is configured to transmit data traffic via a second access network 80, wherein the control unit 65 may be further configured to execute the multipath transport protocol instance 150 on the first data traffic received at the terminal interface 64 and/or on the third data traffic to decide, in dependence of at least one predefined transmission rule, whether the first data traffic and/or the third data traffic are each to be transmitted via the first access interface 62 and/or the second access interface 61 and/or the third access interface 63.

In particular, the control unit 65 may be configured to a) execute the multipath transport protocol instance 150 on the first data traffic received at the terminal interface 64 to decide, in dependence of at least one predefined transmission rule, whether the first data traffic shall be transmitted via the first access interface 62 or the second access interface 61 or the third access interface, or whether some of the data packets of the first data traffic shall be transmitted via the first access interface 62, whereas some other data packets of the first data traffic shall be transmitted via the second access interface 61 and whereas still some other data packets of the first data traffic shall be transmitted via the third access interface 63 and/or to execute the multipath transport protocol instance 150 on the third data traffic to decide, in dependence of at least one predefined transmission rule, whether the third data traffic shall be transmitted via the first access interface 62 or the second access interface 61 or the third access interface 63, or whether some of the data packets of the third data traffic shall be transmitted via the first access interface 62, whereas some other data packets of the third data traffic shall be transmitted via the second access interface 61 and whereas still some other data packets of the third data traffic shall be transmitted via the third access interface 63.

In a preferred embodiment, the control unit 65 may be configured i) to execute fourth instructions, stored on the residential router 60, to store, on the data memory 170, data packets of the first data traffic to be transmitted via the third access interface 63 in a fourth transmission queue 174, data packets of the first data traffic to be transmitted via the second access interface 61 in a fifth transmission queue 175 and data packets of the third data traffic to be transmitted via the second access interface 61 and/or the third access interface 63 in a sixth transmission queue 176, wherein different priorities are assigned to the fourth, fifth and sixth transmission queue, ii) to execute fifth instructions stored on the residential router 60 to read out the first data traffic to be transmitted via the third access interface 63, the first data traffic to be transmitted via the second access interface 61 and the metadata traffic to be transmitted via the second access interface 61 and/or the third access interface 63 according to the priority assigned to the fourth, fifth and sixth transmission queue, and iii) to execute sixth instructions stored on the residential router 60 to transmit, via the second access interface 61 and/or the third access interface 63 the first data traffic and the third data traffic in the order as read out, and wherein the first instructions may be configured to cause, if executed by the control unit 65, the residential router 60 to store only the data packets of the first data traffic, which are to be transmitted via the first access interface 62, on the data memory 170 in the first transmission queue 171 and/or only the data packets of the metadata packets, which are to be transmitted via the first access interface 62, on the data memory 170 in the third transmission queue 173.

Preferably, the fifth instructions may be configured to cause, if executed by the control unit 65, the residential router 60 to read out the data memory 170 with respect to the fourth transmission queue 174, the fifth transmission queue 175 and the sixth transmission queue 176 with an adjustable data rate, and wherein the sixth instructions may be configured to cause, if executed by the control unit 65, the residential router 60 to transmit the data packets of the first data traffic stored on the data memory 170 in the fourth transmission queue 174 and/or the fifth transmission queue 175 and the data packets of the third data traffic stored on the data memory 170 in the sixth transmission queue 176 completely via the second access interface 61, if the second access interface 61 is currently able to transmit data at the adjustable data rate.

In a preferred embodiment, a data traffic separation module 140 may be installed on the residential router 60, which is configured to determine whether the first data traffic is multipath capable data traffic or non-multipath capable data traffic.

Preferably, the data traffic separation module 140 is configured to cause the residential router 60 to bypass the multipath transport protocol instance 150 and to store the detected the non-multipath capable first data traffic on the data memory 170 in the first transmission queue 171 or the fourth transmission queue 174 or the fifth transmission queue 175, wherein the detected multipath capable first data traffic are forwarded to the multipath transport protocol instance 150.

Preferably, the first access interface 62 is an xDSL-based or fiber physical interface, wherein the second access interface 61 can be a Wi-Fi or Powerline Communication based physical interface, and wherein the third access interface, if implemented or activated, can be a cellular wide area network (WAN) based physical interface.

Preferably, the highest priority is assigned to the third transmission queue 171 and to the sixth transmission queue, if implemented, whereas the lowest priority is assigned to the second transmission queue 172 and to the fifth transmission queue, if implemented.

According to a further exemplary aspect, an operator network device 100 for controlling different data traffic is provided, which may comprise a data traffic control device as set forth above and a network interface 103 configured to be connected to a data network 120. The operator network 100 may be configured to transmit the data traffic to at least one residential router 60, 60.n In particular, the first access interface 101 may be configured to communicate via the first access network 90 with at least one residential router 60, 60.n, wherein the control unit 105 may be configured i) to execute the first instructions, stored on the operator network device 100, to store, on the data memory 290, the first data traffic destined for a first residential router 60 in the first transmission queue 291, the second data traffic destined for the first residential router 60 but which are to be transmitted via a second residential router 60.n to the first residential router 60 in the second transmission queue 292, and the third data traffic in the third transmission queue 293, wherein different priorities are assigned to the first transmission queue 291, the second transmission queue 292 and the third transmission queue 293, ii) to execute the second instructions stored on the operator network device 100 to read out the first data traffic, the second data traffic and the third data traffic stored on the data memory 290 according to the priority assigned to the first transmission queue 291, the second transmission queue 292 and the third transmission queue 293, and iii) to execute the third instructions stored on the operator network device 100 to transmit, via the first access interface 101, the first data traffic, the second data traffic and the third data traffic in the order as read out.

In order to improve data throughput and resilience, a second access interface 102 may be implemented on the operator network device 100, which is configured to communicate via a second access network 80 with at least one residential router 60, 60.n, wherein a multipath transport protocol instance 270 may be installed on the operator network device 100, wherein the control unit 105 is further configured to execute the multipath transport protocol instance 270 on the first data traffic and/or on the second data traffic and/or on the third data traffic to decide, in dependence of at least one predefined transmission rule, whether data packets of the first data traffic and/or data packets of the second data traffic and/or data packets of the third data traffic are to be transmitted via the first access interface 101 and/or the second access interface 102.

In order to increase flexibility of the operator network device, a data traffic separation module 260 may be installed on the operator network device 100, which is configured to determine whether the first and/or second data traffic received at the network interface 103 are multipath capable data traffic or non-multipath capable data traffic and wherein the data traffic separation module 260 may be further configured to cause the operator network device 100 to bypass the multipath transport instance 270 and to transmit the non-multipath capable data traffic via the first access interface 101 or the second access interface 102.

Preferably, the highest priority is assigned to the third transmission queue 293, whereas the lowest priority is assigned to the second transmission queue 292.

According to a still further aspect a telecommunication system 10 is provided, which may comprise the following features:

at least one access network 80, 90,
a data network 120, e.g. the Internet,
a group of at least two residential routers 60 and 60.n as set forth above, wherein the at least two residential routers 60 and 60.n as illustrated in FIGS. 2a and 2b, respectively, are configured to communicate with each other via their second access interfaces 61 and 61.*n*, respectively, and an operator network device 100 as set forth above, which is connectable to the data network 120, wherein the at least two residential routers 60 and 60.*n* and the operator network device 100 are each configured to communicated via the at least one access network 80, 90.

Preferably, the residential router 60 may be configured to receive, at the first access interface 62 and/or the third access interface 63, data traffic, to identify the data traffic a second data traffic, for example non-local data packets destined for another residential route, e.g. residential router 60.*n*, and to forward the non-local data packets to the second access interface 61 for transmission to the second access interface 61.*n* of the other residential router 60.*n*.

Furthermore the residential router 60 may be configured to receive data traffic at the first access interface 62 and/or the second access interface 61 and/or the third access interface 63, to identify the data traffic as first data traffic, for example local data packets destined for the user terminal 70 and to forward the local data packets to the terminal interface 64 for transmission to the user terminal 70.

Preferably, a VPN tunneling algorithm 160 is installed on the residential router 60, wherein the control unit 65 is configured to execute the VPN tunneling algorithm 160 to establish a tunnel connection 92 via the first access interface 62 and/or a tunnel connection 82 the third access interface 63 to an operator network device 100 as depicted in FIG. 1.

Preferably, the third data traffic may carry metadata, which may comprise signaling information configured to establish single path or multipath connections and/or signaling information configured to establish VPN tunnel connections 91, 92, 81, 82.

Preferably, an xDSL modem and/or a fiber modem is implemented in the residential router 60.

Preferably, the control unit 105 of the operator network device 100 may be further configured to i) identify data traffic received at the network interface 102 and destined for a first residential router, e.g. residential router 60, and data traffic received at the network interface 102 and destined for a second residential router, e.g. residential router 60.*n* and third data traffic.

Preferably, the at least one predefined transmission rule used by the residential router 60, the residential router and the operator network device 100 is based on a path cost metric or the round trip time associated with the respective access interface. This allows the residential router 60 and/or the operator network device 100 to select, for example, the cheapest access interface, e.g. the first access interface 62 and 101, respectively, to transmit the first, second and/or third data traffic.

Preferably, the multipath transport protocol instance 150 and 270, respectively, may be based on the multipath transmission control protocol (MPTCP) and the multipath capable data traffic may comprise TCP data packets.

Preferably, the first access interface 62 is an xDSL-based or a fiber-based interface, the second access interface 61 is a Powerline Communication based interface or a WiFi-based interface, and the third access interface 63 is a cellular WAN based interface, e.g. a LTE interface.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A residential router for controlling different data traffic, the residential router comprising:

a data traffic control device comprising a first access interface configured to transmit data traffic via a first access network, a data memory, and at least one control unit, wherein the at least one control unit is configured to:

execute first instructions, stored on the data traffic control device, to store, on the data memory, first data traffic in a first transmission queue, second data traffic in a second transmission queue and third data traffic in a third transmission queue, wherein different priorities are assigned to the first, second and third transmission queues;

execute second instructions, stored on the data traffic control device, to read out the first data traffic, the second data traffic and the third data traffic stored on the data memory according to the priorities assigned to the first, second and third transmission queues; and execute third instructions, stored on the data traffic control device, to transmit, via the first access interface, the first data traffic, the second data traffic and the third data traffic in an order as read out, wherein the first data traffic, the second data traffic and the third data traffic each comprise a plurality of data packets;

a terminal interface configured to receive the first data traffic from a residential user terminal; and a second access interface configured to receive the second data traffic from another residential router, wherein the residential router and the other residential router are assigned to different customers;

wherein a multipath transport protocol instance is installed on the residential router;

wherein a data traffic separation module is installed on the residential router, wherein the data traffic separation module is configured to determine whether the first data traffic is multipath capable data traffic or non-multipath capable data traffic;

wherein the data traffic separation module is further configured to:
cause the residential router to bypass the multipath transport protocol instance;
store first data traffic which is non-multipath capable on the data memory in the first transmission queue or a fourth transmission queue or a fifth transmission queue; and
forward first data traffic which is multipath capable to the multipath transport protocol instance.

2. The residential router of claim 1,
wherein the at least one control unit is further configured to execute the multipath transport protocol instance on the first data traffic received at the terminal interface and/or on the third data traffic to decide, in dependence of at least one predefined transmission rule, whether the first data traffic and/or the third data traffic are each to be transmitted via the first access interface and/or the second access interface.

3. The residential router of claim 1, wherein a third access interface is implemented on the residential router, wherein the third access interface is configured to transmit data traffic via a second access network;
wherein the at least one control unit is further configured to execute the multipath transport protocol instance on the first data traffic received at the terminal interface and/or on the third data traffic to decide, in dependence of at least one predefined transmission rule, whether the first data traffic and/or the third data traffic are each to be transmitted via the first access interface and/or the second access interface and/or the third access interface.

4. The residential router of claim 3, wherein the at least one control unit is further configured to:
execute fourth instructions, stored on the residential router, to store, on the data memory, data packets of the first data traffic to be transmitted via the third access interface in the fourth transmission queue, data packets of the first data traffic to be transmitted via the second access interface in the fifth transmission queue, and data packets of the third data traffic to be transmitted via the second access interface and/or the third access interface in a sixth transmission queue, wherein different priorities are assigned to the fourth, fifth and sixth transmission queues;
execute fifth instructions stored on the residential router to read out the first data traffic to be transmitted via the third access interface, the first data traffic to be transmitted via the second access interface, and the third data traffic to be transmitted via the second access interface and/or the third access interface according to the priorities assigned to the fourth, fifth and sixth transmission queues; and
execute sixth instructions stored on the residential router to transmit, via the second access interface and/or the third access interface, the first data traffic and the third data traffic in an order as read out; and
wherein the first instructions are configured to cause, when executed by the at least one control unit, the residential router to store only the data packets of the first data traffic which are to be transmitted via the first access interface on the data memory in the first transmission queue and/or only the data packets of the third data traffic which are to be transmitted via the first access interface on the data memory in the third transmission queue.

5. The residential router of claim 4, wherein the fifth instructions are configured to cause, when executed by the at least one control unit, the residential router to read out the data memory with respect to the fourth transmission queue, the fifth transmission queue and the sixth transmission queue with an adjustable data rate, and wherein the sixth instructions are configured to cause, when executed by the at least one control unit, the residential router to transmit the data packets of the first data traffic stored on the data memory in the fourth transmission queue and/or the fifth transmission queue and the data packets of the third data traffic stored on the data memory in the sixth transmission queue completely via the second access interface, based on the second access interface being currently able to transmit data at the adjustable data rate.

6. The residential router of claim 1, wherein the first access interface is an xDSL-based or fiber physical interface;
wherein the second access interface is a Wi-Fi or powerline communication (PLC)-based physical interface; and
wherein a third access interface is implemented on the residential router, wherein the third access interface is a cellular wide area network (WAN)-based physical interface.

7. The residential router of claim 1, wherein the highest priority is assigned to the third transmission queue, and the lowest priority is assigned to the second transmission queue.

8. An operator network device for controlling different data traffic to be transmitted to at least one residential router, the operator network device comprising:
a data traffic control device comprising a first access interface configured to transmit data traffic via a first access network, a data memory, and at least one control unit, wherein the at least one control unit is configured to:
execute first instructions, stored on the data traffic control device, to store, on the data memory, first data traffic in a first transmission queue, second data traffic in a second transmission queue and third data traffic in a third transmission queue, wherein different priorities are assigned to the first, second and third transmission queues;
execute second instructions, stored on the data traffic control device, to read out the first data traffic, the second data traffic and the third data traffic stored on the data memory according to the priorities assigned to the first, second and third transmission queues; and
execute third instructions, stored on the data traffic control device, to transmit, via the first access interface, the first data traffic, the second data traffic and the third data traffic in an order as read out, wherein the first data traffic, the second data traffic and the third data traffic each comprise a plurality of data packets; and
a network interface configured to be connected to a data network;
wherein a second access interface is implemented on the operator network device, wherein the second access interface is configured to communicate via a second access network with the at least one residential router;

wherein a multipath transport protocol instance is installed on the operator network device;

wherein the at least one control unit is further configured to execute the multipath transport protocol instance on the first data traffic and/or on the second data traffic and/or on the third data traffic to decide, in dependence of at least one predefined transmission rule, whether data packets of the first data traffic and/or data packets of the second data traffic and/or data packets of the third data traffic are to be transmitted via the first access interface and/or the second access interface;

wherein a data traffic separation module is installed on the operator network device, wherein the data traffic separation module is configured to:

determine whether the first and/or second data traffic received at the network interface are multipath capable data traffic or non-multipath capable data traffic; and cause the operator network device to bypass the multipath transport protocol instance and to transmit non-multipath capable data traffic via the first access interface or the second access interface.

9. The operator network device of claim 8, wherein the highest priority is assigned to the third transmission queue, and the lowest priority is assigned to the second transmission queue.

* * * * *